(12) United States Patent
Singh et al.

(10) Patent No.: US 8,433,472 B2
(45) Date of Patent: Apr. 30, 2013

(54) EVENT-DRIVEN DATA MINING METHOD FOR IMPROVING FAULT CODE SETTINGS AND ISOLATING FAULTS

(75) Inventors: Satnam Singh, Bangalore (IN);
Aurobinda Routray, Kharagpur (IN);
Aparna Rajaguru, Kharagpur (IN)

(73) Assignee: GM Global Technology Operations LLC, Detroit, MI (US)

( * ) Notice: Subject to any disclaimer, the term of this patent is extended or adjusted under 35 U.S.C. 154(b) by 372 days.

(21) Appl. No.: 12/850,058

(22) Filed: Aug. 4, 2010

(65) Prior Publication Data

US 2012/0035803 A1 Feb. 9, 2012

(51) Int. Cl.
*G06F 19/24* (2011.01)

(52) U.S. Cl.
USPC ........ 701/31.4; 701/31.6; 701/31.7; 701/31.8

(58) Field of Classification Search .................. None
See application file for complete search history.

(56) References Cited

U.S. PATENT DOCUMENTS

| | | | | |
|---|---|---|---|---|
| 7,715,961 B1 * | 5/2010 | Kargupta | ................ | 701/29.3 |
| 2005/0114743 A1 * | 5/2005 | Moorhouse | ................ | 714/100 |
| 2005/0265607 A1 * | 12/2005 | Chang | ................ | 382/224 |
| 2008/0004764 A1 * | 1/2008 | Chinnadurai et al. | ......... | 701/29 |
| 2008/0004840 A1 * | 1/2008 | Pattipatti et al. | ............. | 702/183 |
| 2010/0082197 A1 * | 4/2010 | Kolbet et al. | ................ | 701/29 |
| 2011/0035094 A1 * | 2/2011 | Van Den Berg et al. | ........ | 701/33 |
| 2011/0123100 A1 * | 5/2011 | Carroll et al. | ................ | 382/155 |
| 2011/0172874 A1 * | 7/2011 | Patnaik et al. | ................ | 701/33 |
| 2011/0238259 A1 * | 9/2011 | Bai et al. | ................ | 701/33 |
| 2012/0136913 A1 * | 5/2012 | Duong et al. | ................ | 708/819 |

FOREIGN PATENT DOCUMENTS

SE 2008000327 * 11/2008

* cited by examiner

*Primary Examiner* — Khoi Tran
*Assistant Examiner* — Adam Mott

(57) ABSTRACT

A parameter identification-based fault isolation technique is provided for improving fault code settings and isolating faults. DTCs and PIDs are retrieved from a current serviced vehicle. PID data is obtained from prior serviced vehicles having same vehicle specifications as and under substantially similar operating conditions as the current serviced vehicles. A plurality of clusters is formed using PID data of the prior serviced vehicles using mutual dependence to one another. A joint probability distribution is determined as a function of a mutual dependence of the PID data. PID data is selected of the current serviced vehicle having coherence to the PID of the prior service vehicles. A mutual dependence of the PID data of the current serviced vehicle is projected on onto the corresponding joint probability distribution. An anomaly in the PID data of the current serviced vehicle is detected in response to the probability distribution of parameter identification data being outside of a predetermined variance.

18 Claims, 5 Drawing Sheets

EVENT-DRIVEN DATA MINING METHOD FOR IMPROVING FAULT CODE SETTINGS AND ISOLATING FAULTS

BACKGROUND OF INVENTION

An embodiment relates generally to identifying detection of faults and anomalies in the service repair data.

Service providers, such as service department at a dealership, diagnose issues in the vehicle electronics with the aid of service diagnostic tools that utilize diagnostic software algorithms. Diagnostic trouble codes (DTCs) are set in the vehicle based on diagnostic software algorithms. The service diagnostic tools retrieves DTCs from a vehicle processor memory and are used to determine the fault in the vehicle. Each of the processors in the vehicle includes a memory that stores DTCs when the vehicle experiences a fault and is detected. The service technician can review the current or history of any DTCs for determining the root cause in the vehicle. DTCs are alphanumeric codes that are used to identify a fault that occurs in various components within the vehicle. Such DTCs are related to various electrical vehicle functions that include, but are not limited to, engine operation, emissions, braking, powertrain, safety, and steering. Each subsystem may have its own on-board processor for monitoring faults of the subsystem operation or a processor may be responsible for monitoring faults for a plurality of subsystems. When the subsystem processor detects a fault, one or more DTCs are generated.

The DTCs assist the service technician in pinpointing the area of concern. DTCs are retrieved by the service technician with the aid of a scan tool. Although the DTC provides assistance to the technician in pinpointing the area of concern, the DTC does not provide definitive information as to what exactly caused the problem. Usually, a DTC indicates a fault either in a specific component, circuit connecting component to the control module or in the control module itself. Now, it is still up to the technician to identify the root cause by performing further electrical circuit tests, utilize analytical reasoning, prior experience, or a best guess. Hence, DTCs provides diagnostics only up to certain extent, additional diagnostic resolution could be obtained only via performing additional field tests and collecting additional operating parameter data from the vehicle. Sometimes, the algorithm generating the DTC may have an error in and provide an incorrect diagnostic to the technician. In addition, the DTCs may exhibit intermittent behavior which is hard to fix by technicians due to absence of the DTC setting operating conditions. Intermittent behavior of faults is those instances when a fault is triggered and recorded; however, the fault conditions cannot be repeated at the service repair center.

The scan tool may further retrieve on-board diagnostic operating parameter identifiers (PIDs) for determining specific information output by a sensor or similar device. A PID code is an operating parameter of a component that is recorded via the scan tool which is transmitted by reading from the communication bus of the vehicle. One of the devices on the communication bus recognizes the PID code for which it is responsible and sends back information relating to the PID code for which further details relating to one or more of the devices sensing data relating to the detected fault. However, the number of PIDs relating to a DTC may be quite numerous and a service personnel randomly analyzing the PID codes is time consuming as well as burdensome.

SUMMARY OF INVENTION

An advantage of an embodiment is the detection of errors in diagnostic software algorithms utilizing operating parameter identifier (PIDs) data. In addition, in the absence of any anomalies detected in the operating parameter identifiers, a determination may be made whether the fault relates to the identified circuit currently being tested and serviced utilizing the PIDs. The technique described herein can analyze available PIDs, categorize PIDs into informative or non-informative categories, detect fault conditions from the categories, determine whether an error exists in the diagnostic algorithm, determine the key PIDs responsible for characterizing the intermittent DTCs and determine whether the fault relates to the identified circuit tested.

An embodiment contemplates a parameter identification-based fault isolation technique. A diagnostic software routine is executed for identifying diagnostic trouble codes used to detect faults in a circuit of a current serviced vehicle. The diagnostic software routine retrieves parameter identification data relating to the circuit identified with the detected fault. Parameter identification data of prior serviced vehicles is obtained on a computer. The parameter identification data is retrieved from the prior serviced vehicles that include vehicles having same vehicle specifications as the current serviced vehicle under substantially similar operating conditions as the current serviced vehicle. The parameter identification data of the prior serviced vehicles are grouped into a plurality of clusters based on mutual dependence to one another. A joint probability distribution is determined as a function of a mutual dependence of the parameter identification data of the prior serviced vehicles. Parameter identification data of the current serviced vehicle is selected having coherence to the parameter identification data from the prior serviced vehicles. A mutual dependence of the parameter identification data of the current serviced vehicle is projected onto the corresponding joint probability distribution. An anomaly in the parameter identification data of the current serviced vehicle is detected in response to the probability distribution of parameter identification data being outside of a predetermined variance. The detected anomaly represents at least one of an error in the diagnostic software routine or an intermittent occurrence of a respective diagnostic trouble code. At least one of the diagnostic software routine or a component associated with the intermitted occurrence of the respective diagnostic trouble code is modified to correct the error.

DETAILED DESCRIPTION

Figure 1:
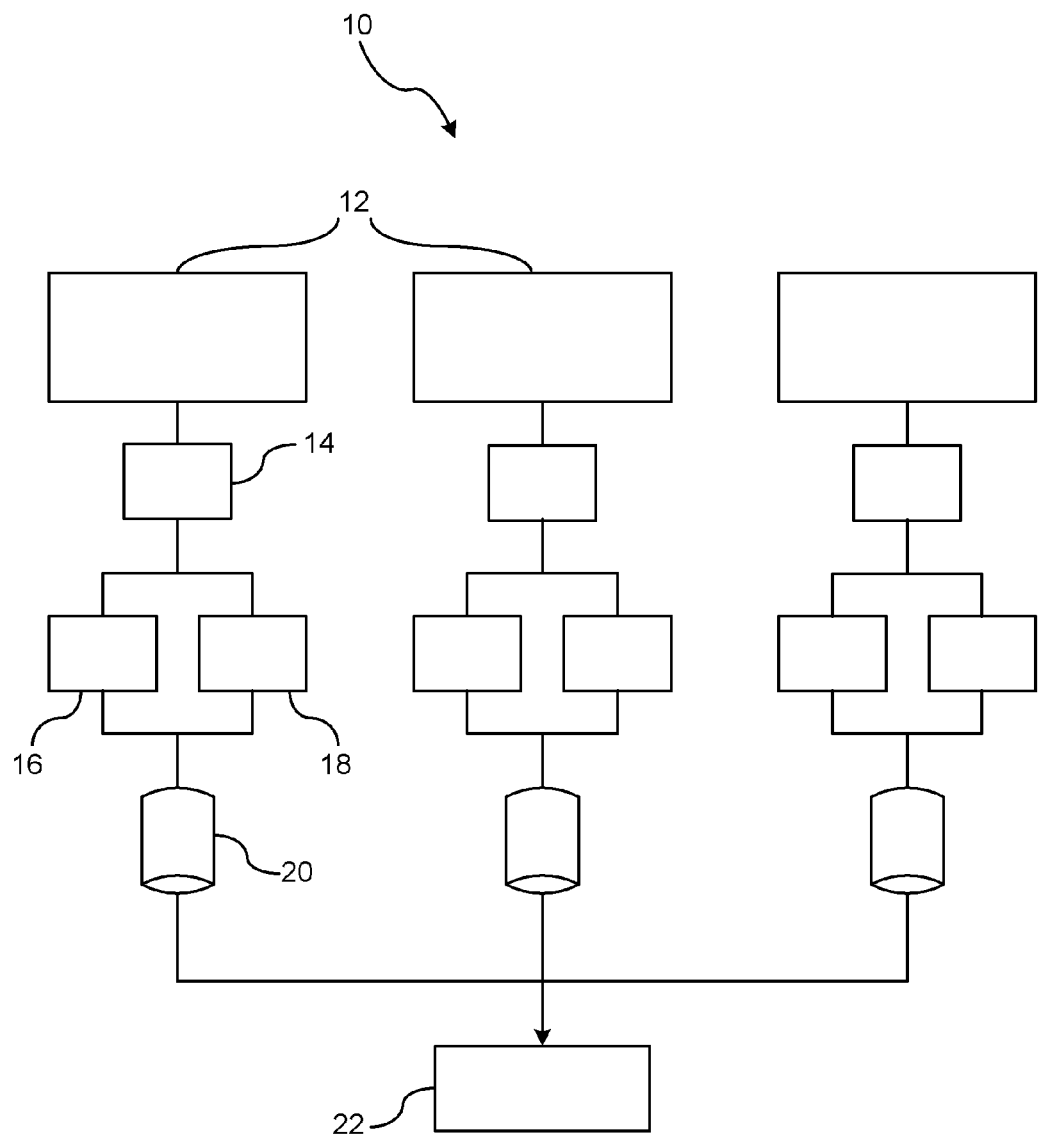
FIG. 1 is a block diagram of a diagnostic repair reporting system.

There is shown in FIG. 1 a diagnostic repair reporting system 10. The diagnostic repair reporting system 10 includes a plurality of service centers 12 for reporting diagnostic trouble codes (DTCs) obtained from servicing vehicles.

To determine whether a misdiagnosis has occurred for a specific service repair, repair data is retrieved from the service shops. Original equipment manufacturers, such as automotive companies, maintain an online repair reporting system. In this example, the vehicles are brought to a service shop, such as a service department at a dealership. The technicians will run a diagnostic check on the vehicle using a scan tool 14 that communicates with one or more processors in the vehicle (e.g. engine control module). Each of the processors in the vehicle includes a memory or utilizes remote memory for storing DTCs 16 when the vehicle experiences a problem and an error code is recorded. Storing the DTCs 16 in the vehicle processor memory alleviates the service technician of trying to recapture the problem with the vehicle, particularly if the vehicle is not currently symptomatic of the problem; rather, the service technician can review the current or past history of any DTCs that have been stored in the memory of the vehicle for determining what issues were present with the vehicle when the problem occurred. DTCs 16 are alphanumeric codes that are used to identify a problem that occurs in various components in the vehicle. Such DTCs 16 may be related to various vehicle functions that include, but are not limited to, engine operation, emissions, braking, powertrain, and steering. Each subsystem may have its own on-board processor for monitoring faults of the subsystem operation or a processor may be responsible for monitoring faults for a plurality of subsystems. When the subsystem processor detects a fault, one or more DTCs 16 are generated. The DTCs 16 are stored in the processor's memory and are later retrieved by the service technician when tested. The DTCs 16 assist the service technician in pinpointing the area of concern. To retrieve a DTC 16, the service technician enters a mode on the scan tool 14 requesting retrieval of DTCs 16 stored for a current or past driving cycle. However, the number of DTCs 16 is limited in a vehicle and finding the root cause becomes very difficult if several DTCs 16 are triggered simultaneously. The scan tool 16 may also be used to retrieve the operating parameter identifiers (PIDs) 18 which are recorded at the time of DTC is triggered and recorded by the on-board processors. The health of the subsystems is typically monitored by a plurality (e.g., thousands) of operating PIDs 18 which are continuously collected using various sensors and diagnostic software routines contained in the on-board processors. The PIDs 18 are collected from freeze frame data, which is a set of limited number of instances when the DTC occurred. The information in the PIDs 18 may include data concerning its operating condition (e.g., ratio of the air-fuel mixture is provided so that a determination may be made whether the ratio is within a minimum and maximum value). The DTCs 16 and PIDs 18 are collected and stored in a plurality of storage devices 20 which may be retrieved for later analysis. An analysis tool 22 is in communication with the storage devices 20 for retrieving all or a portion of the service data containing the DTCs 16 and PIDs 18 of prior serviced vehicles to assist in identifying root causes of a current serviced vehicle. The analysis tool 22 may include a computer, laptop, handheld wireless processing device, or similar device that store data and execute the diagnostic routines as described herein.

The methodology described herein provides a data-driven technique to systematically analyze the PIDs, and in the absence of any anomaly, classify faults within the automotive system. That is, a determination is made whether the fault described by the test data belongs to a fault described in a training data analysis utilizing historical data which will be described in detail later. PIDs that show similar trends in variation are described as coherent. As a result, clusters are formed utilizing coherent PIDs after identifying coherence among the PIDs in a training phase. After clusters are formed, a comparative analysis of the behavior of PIDs belonging to a same cluster between the training data and the test data can now be used for anomaly detection. Since a system fault is described by all PIDs across all clusters for a respective particular instance of fault, a joint probability distribution of the PIDs can be used to characterize the group of faults being classified. As a result, the technique executed includes a training phase that utilizes historical serviced data and a testing phase that uses both the current service data and historical service data to detect the fault.

Figure 2:
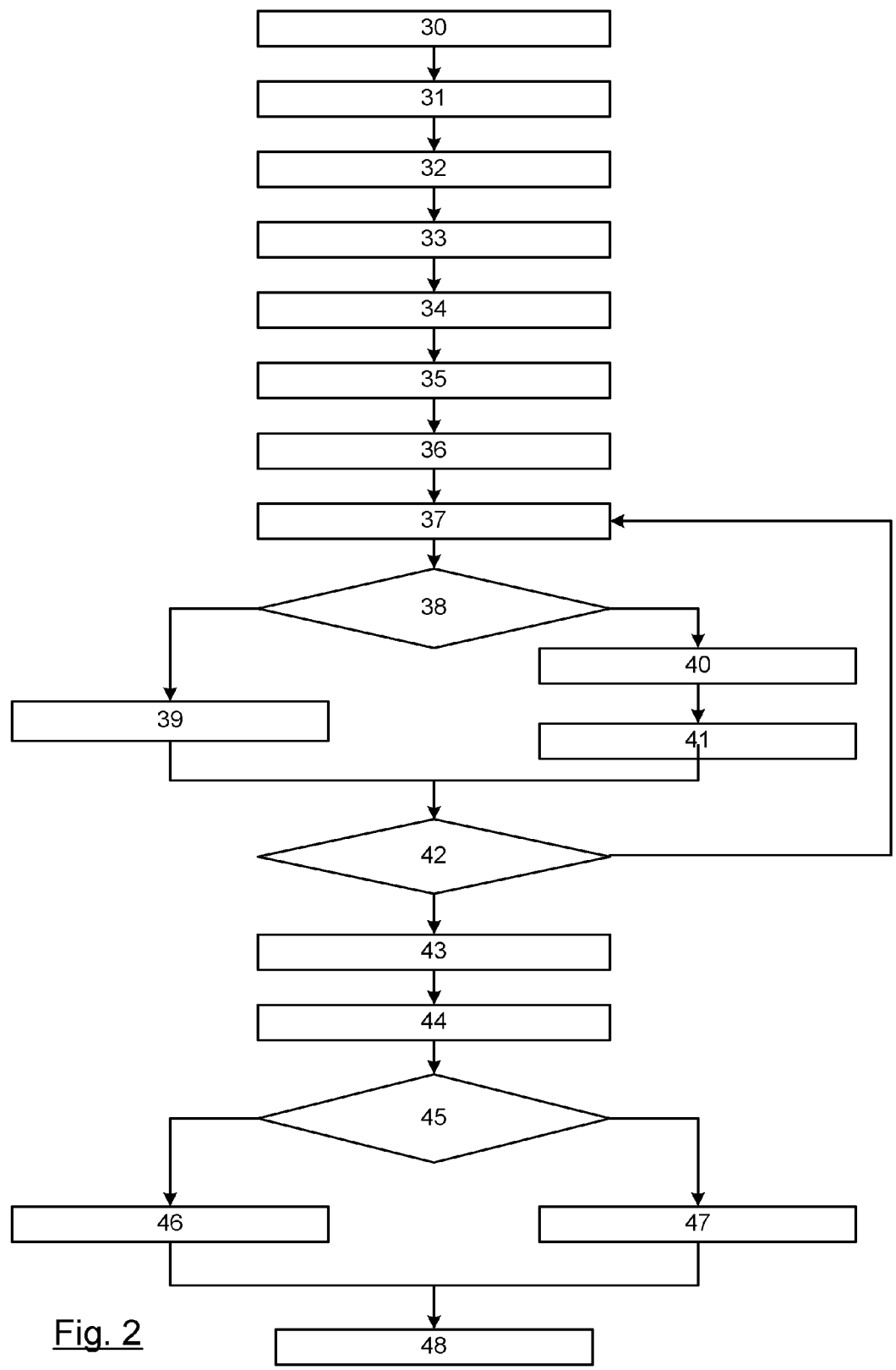
FIG. 2 is a flowchart of a method for an anomaly and fault classification technique.

FIG. 2 illustrates a flowchart of a broad overview of the training phase portion and testing portion to the fault detection technique. In step 30, several patterns of PID data are retrieved from previously service vehicles. A pattern as described herein is a group of PID values for a specific vehicle and specific DTC. For example, if a specific vehicle had a specific DTC that was triggered, then at the time when DTC is triggered, the onboard processor records respective sensor values (PIDs) such as vehicle speed, throttle angle, engine coolant temperature, ambient temperature. The training data retrieved is from vehicles having the same vehicle specifications as the current serviced vehicle.

DTCs that are determined to be intermittent are preferably identified and tagged as an intermittent DTC by the off-board diagnostic tool. A set of heuristic guidelines may be set up in the diagnostic tool to identify when an intermittent DTC occurs and the identified intermittent DTC is thereafter tagged or labeled as an intermittent DTC for future analysis.

In step 31, PID data is preprocessed to categorize the PID data and eliminate unrelated and constant-valued PIDs using automotive domain knowledge.

In step 32, the data is analyzed for coherence across the various PID values using a data reduction technique which utilizes correlation and information-theoretic measures. A key assumption in the data reduction technique described herein is a presence of coherence among the PIDs. Coherence provides justification for forming the clusters of coherent PIDs such that PIDs in a same cluster have similar variation due to their respective coherence. Data reduction may be applied using Principal Component Analysis (PCA) and Independent Component Analysis (ICA) for reducing the data size and finding coherence among PID values.

PCA identifies a linear combination of variables that best describe variability in the dataset. The linear combination of variables are calculated by an eigenvector decomposition of a covariance matrix of the PID data. Linear combination of variables which describes the most variability (e.g., 90% of the total variance in the dataset) are used as basis vectors for transforming the data into a new reduced-dimensional space. Information is extracted regarding the redundancy in the dataset. Further, PCA is effective only under the assumption that the data has Gaussian distribution which may not be true for automotive systems because there are several nonlinear processes which could generate non-Gaussian data.

ICA is a non-linear technique to estimate statistically independent components from a data matrix. ICA is utilized for linear representation of non-Gaussian data so that the components are statistically independent, or as independent as possible. ICA is most effective in systems that are highly nonlinear where data is more likely to be non-Gaussian. Since data reduction has already been reduced utilizing PCA, ICA is applied to the PCA data output to check if any further reduction is possible.

The redundancy determined by PCA and ICA shows the coherence present amongst the PIDs that can be utilized for fault detection in two approaches. The first approach reduces the number of PIDs and forms a data set with several-fold reduction in data size and then divides the PID data into as many clusters as the number of statistically independent components. Statistical Independence between two components implies that the value of one component does not depend on the value of the other. The second approach helps us in identifying anomalous PIDs by checking its statistical deviation with its expected cluster which is described below in step 32.

An emissions system will be described herein as an example of a vehicle system that utilizes the concepts explained in this application to detect anomalies in the diagnostic algorithms and to perform fault isolation. It should be understood that the emission system as described as follows is only one example of the various vehicle systems that may utilize the fault isolation technique. The vehicle system includes an HO2S heater control bank. The HO2S heater performance bank and HO2S heater resistance circuit bank includes 1376 patterns. A resulting dataset for the both banks has dimensions 1376×253 where the dimension 253 represents the number of PIDs that consist of both binary and real-valued PIDs. From these, 42 PIDs are selected using the domain knowledge as discussed in step 30. The resulting dataset has dimensions of 1376×42.

Figure 3:
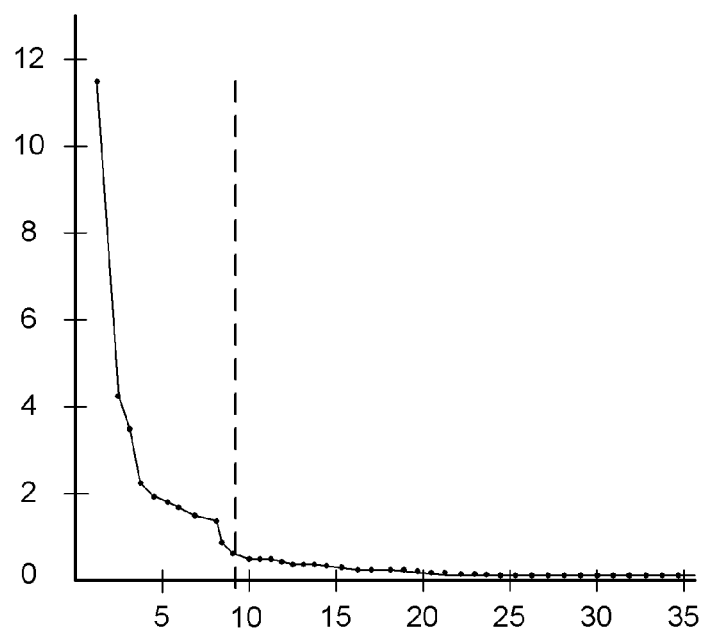
FIG. 3 is a scree plot for identifying principal components for use in clustering and divergence analysis.

The resulting dataset is next examined for redundancy using both PCA and ICA methods as discussed. In PCA, the orthogonal directions along maximum variation are identified. FIG. 3 shows a scree plot used to identify principal components that are to be selected for clustering. The plot utilizes variance values on the y-axis and an index of the principal components on the x-axis. It is observed that a significant knee occurs at the $9^{th}$ principal component. The first 9 components are determined to account for substantially 90% of the total variance in the dataset. This implies that the data from the PIDs show major variation along 9 orthogonal directions. Utilizing an assumption that Principal Components in PCA with larger associated variance represent the targeted structure and those with lower variation represent noise, coherence in the data can be inferred. The components identified under PCA are further processed using ICA and the entropy of each latent independent component determined is estimated.

From the ICA analysis, 7 of the 9 components are found to be significant. The reduction from 9 to 7 components indicates that there is redundancy in the PID data which can be analyzed via clustering.

In step 33, clustering is performed to find the actual number of clusters and their consistency to represent the original data. Clustering involves an unsupervised technique of classifying unlabeled PID datasets into finite hidden data-structures depending on their proximity in some feature space. Here, the PID data is unlabeled because the faults are not known before the analysis. The clustering involves selection of distinguishing features from a set of candidates and then transforming them to generate novel features from the original ones (e.g., proximity measures). The selected samples are then clustered according to their proximity in the transformed feature space. Once a proximity measure is chosen, the construction of a clustering criterion function makes the partition of clusters an optimization problem. The optimality of the clustering process can be verified by a Silhouette plot that measures the Silhouette width of a PID in a cluster.

Figure 4A:
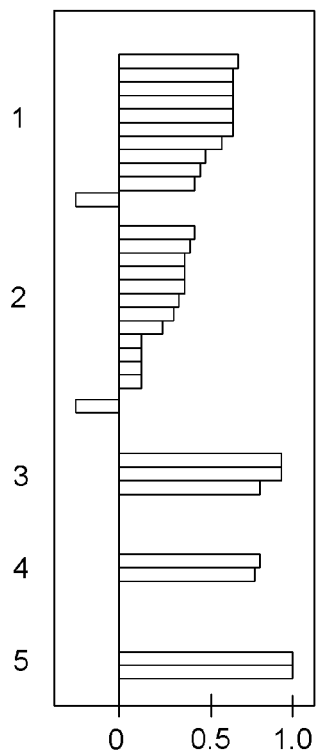
FIGS. 4a-4c are silhouette plots for identifying properly grouped clusters.
Figure 4B:
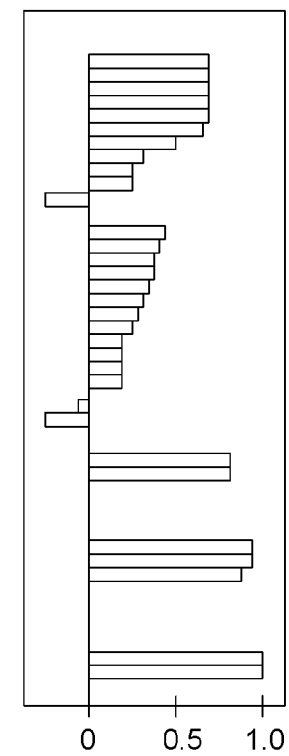
Figure 4C:
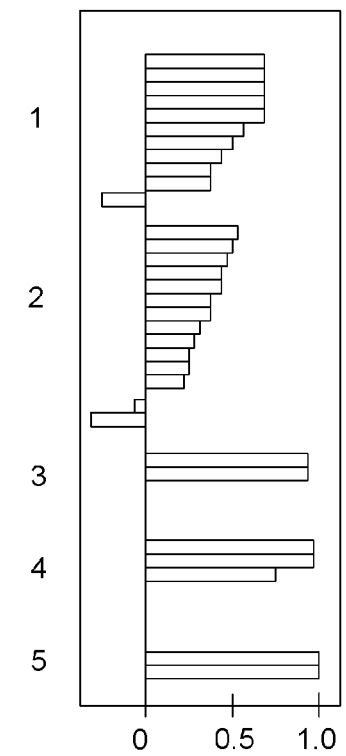

FIGS. 4a-4c illustrate datasets of silhouette plots for respective clusters (e.g. clusters 1-5) based on mutual information between the PIDs. The horizontal width $S_{w_j}$ of each respective bar in the chart varies from 1, which is good clustering, to −1 which is inferior clustering. Clustering can be performed based on either distance measures or mutual information measures.

Clustering based on distance may utilize Euclidean distance or Mindowski distance. Euclidean distance is a special case of the Minkowski distance. The drawback of Minkowski distances is that the largest scaled feature tends to dominate other features. As a result, the data needs to be normalized before clustering. A comparison between syntactic and statistical measures of data clustering suggests that the later out performs the former.

Clustering based on mutual information is another example of how to form clusters of PIDs. In regards to a mutual dependence between two PIDs, if two PIDs have a high value of mutual information, then the two PIDs are assumed to have a high degree of dependence between them. PIDs having a high degree of mutual information are termed coherent and are grouped together. With respect to a determination of intermittent DTCs, intermittent DTCs may be initially grouped as a class and non-intermittent DTCs may be grouped as another class. Mutual information between the classes may then be analyzed and clustered to determine the key PIDs which distinguishes the intermittent DTCs from non-intermittent DTCs. A distribution of similarity of PIDs in a cluster provides domain knowledge. There are as many distributions as there are clusters. When a series of PIDs are obtained from a new vehicle, the PIDs are tested in clusters in light of the knowledge gained from previous serviced vehicles. The mutual information is computed among these PIDs in corresponding clusters and the mutual information values are projected onto the previously estimated distributions of distances across each cluster. If there is a substantial amount of deviation with respect to a specific PID in a particular cluster, then the PID is considered anomalous and is not used in the evaluation process for determining the fault.

Referring again to FIGS. 4a-4c, datasets of silhouette plots are illustrated for respective clusters (e.g. clusters 1-5) based on mutual information between the PIDs. Each horizontal bar corresponds to a PID and every contiguous set of bars represents a cluster along the y-axis. The clusters are grouped 1-5 along the y-axis. The x-axis represents a Silhouette value. As described earlier, the length of each horizontal bar ($S_{w_j}$—Silhouette width) is a measure of a tendency of a respective PID to belong to the cluster it is in. Therefore, horizontal bars with positive Silhouette values represent properly grouped clusters whereas clusters having negative Silhouette values represent poorly grouped clusters. Recall that PIDs in a cluster are coherent. This implies that that parameters indicated by PIDs in one cluster have similar trends in variation. If the PIDs are not erroneous, any change in one parameter should be accompanied by similar variations in all other parameters. As a result, mutual information among the PIDs should have similar distributions in both historical training datasets and testing datasets in the absence of any anomaly in the PIDs.

Figure 5:
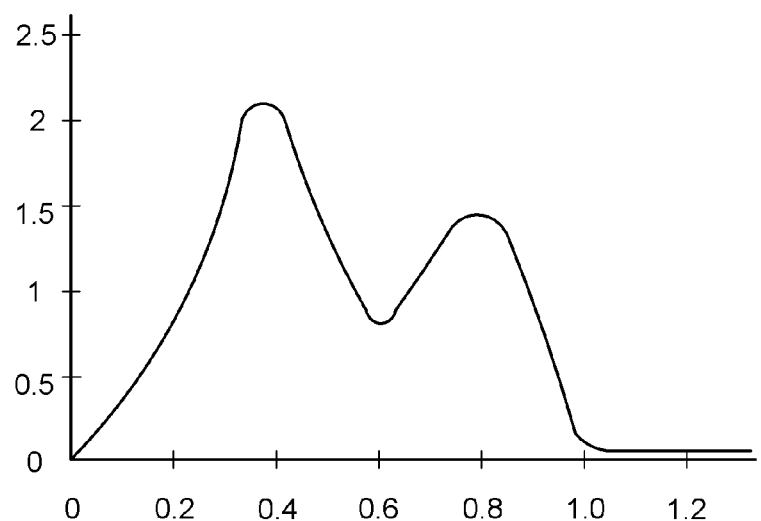
FIG. 5 is a distribution density plot for PID training dataset.

The mutual information is measured to characterize the coherence amongst the PIDs. The distribution of the coherence is further characterized by plotting the distribution density functions and mutual information for each cluster. An example of a plot for a respective cluster for a training dataset is shown in FIG. 5. The x-axis represents similarity values using mutual information whereas the y-axis represents a distribution function for the respective cluster.

In step 34 information groups are generated. Information groups are generated by randomly selecting one PID from each cluster. In addition, any singleton PID (i.e., a single PID that doesn't belong to a cluster) may be added to the information groups. Information content of the information group is a measurable used to determine the joint entropy of the PIDs within each respective information group. The information groups are used to determine the divergence of the PIDs which will be discussed in detail later. The divergence of the PIDs is used for determining fault classification.

In step 35, the anomaly and fault detection process utilizing the current vehicle test data set is initiated. A presence of anomalies is first determined, and then fault classification is determined. A fault is characterized by applying the joint probability distribution to the PIDs in its entirety. The state of the system under a fault is described by the values of the PIDs, and therefore, is a function of all PIDs across all clusters. As a preliminary step for fault classification, a joint probability distribution of the independent components of all PIDs is determined in the training phase.

Fault classification can be performed by determining the Kulback-Leibler divergence (KL divergence) between the joint probability of the independent components in the training set PIDs and that of the PIDs in the testing set. The KL divergence quantifies the proximity between two probability distribution functions.

In step 36, several patterns of PID data are retrieved from the current serviced vehicle.

In step 37, a respective test PID from the current serviced vehicle is identified. The respective PID from the current serviced vehicle is analyzed by applying an anomaly detection technique to detect if an anomaly is present. To detect the anomaly, the distribution of mutual information between the PIDs data for the historical data (i.e., prior serviced vehicles) and test data of the current serviced vehicle are determined. If the mutual information distribution is similar, then the determination made is that the PID is not anomalous. Similarly, if the KL divergence between the test data and training data low, then the low divergence indicates that the fault belongs to the modeled class. A dissimilarity between the mutual information distributions indicates a presence of anomalous PIDs and a high value of divergence indicates that the fault does not belong to the targeted fault class. Fault detection is executed by estimating a divergence between a joint probability distributions of the PIDs observed from the current serviced vehicle within that of the joint probability distribution of the prior serviced vehicles. In an example of a DTC triggered during an operation of a vehicle indicating an occurrence of a possible fault, the generation of a DTC may not always indicate the root cause of the fault as the DTCs are generated based on a diagnostic routine which follows predetermined logical or hard decisions. However, anomalies may be detected by analyzing the PIDs in clusters formed previously in the training phase. Since PIDs are coherent, any variation in one parameter should be accompanied by similar variations in all other coherent parameters under normal conditions. The distance and mutual information between those PIDs should remain the same for any later instance of the fault. If any of the PIDs are anomalous, then the respective PID will not remain coherent with other PIDs in its cluster as the distance of this PID with respect to others in the same cluster will differ from its previously estimated values. Therefore, a determination is first made as to whether anomalies exist in the data before determining whether the fault belongs to the targeted class The mutual information of the PID being tested for an anomaly with respect to others in an associated cluster of the training data set are projected onto the already computed distribution density functions of the training data set. For example, PID-values for a Mass Air Flow (MAF) sensor of the current serviced vehicle are recorded. The PID-values for the MAF sensor are grouped in cluster-1 which has 12 different PIDs. The first step is to compute the mutual information of the MAF output PID value with respect to the 11 other PID values and then project each of them to obtain the distribution function of the MAF cluster-1. The process is repeated by selecting random sets of 50 patterns each time.

Figure 6:
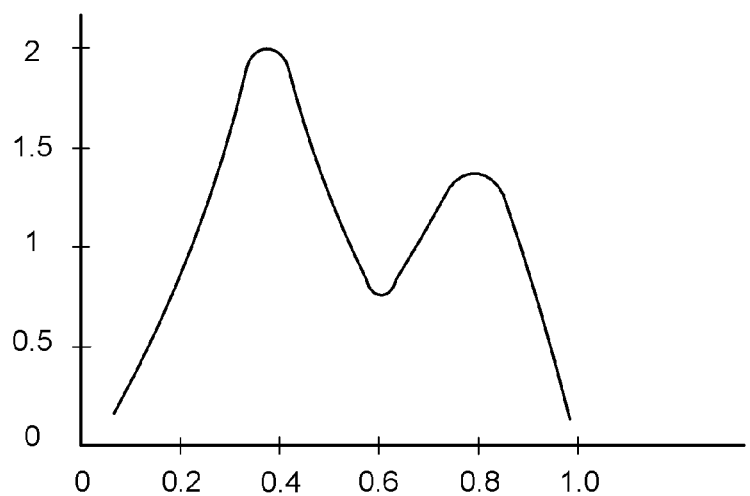
FIG. 6 is an exemplary distribution density plot for PID test data indicating coherence between the datasets.

FIG. 6 shows a plot of the estimated distribution function versus the mutual information of this PID with respect to the other PIDs for the current serviced vehicle. The plot shown in FIG. 6 is similar to the MAF sensor plot in FIG. 5, and therefore, the divergence is low. The similarity between the test data plot (FIG. 6) and the training data plot (FIG. 5) indicates that there is coherence with the other PIDs in cluster-1 so that the respective PID is not anomalous. This process has to be repeated for all PIDs in the testing dataset.

Figure 7:
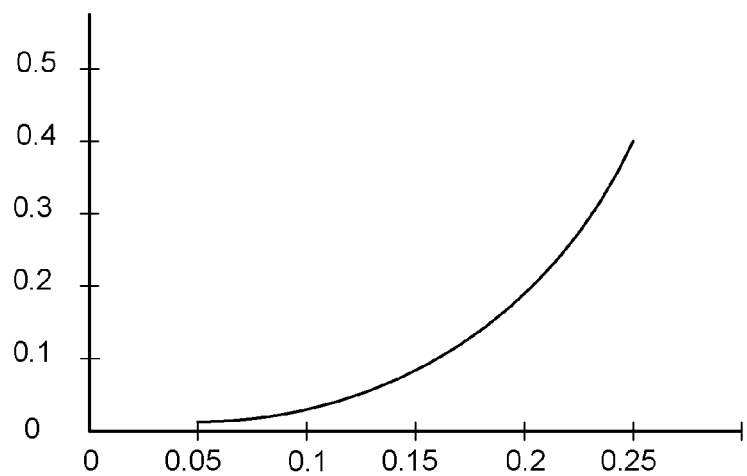
FIG. 7 is an exemplary distribution density plot for PID test data indicating non-coherence between the datasets.

FIG. 7 illustrates an example of a plot where the estimated probability distribution function of the testing data set does not show similarity to the training data set. The dissimilarity indicates that the respective PID tested is anomalous. As a result, the dissimilarity indicates that there is an error in the diagnostic software algorithm. An anomaly as mentioned above may include a PID which has incorrect values or may include a PID associated with an intermittent DTC as described earlier. To determine anomalies that are associated with the intermittent DTCs, the DTCs that were identified as intermittent that are maintained in the dataset of a cluster are projected onto the already computed distribution density function of the training data set. In the same manner as discussed above, a comparison is made to determine if the divergence is low or the divergence is high. A low divergence between the PIDs associated with the intermittent DTCs and the PIDs associated with the non-intermittent DTCs indicates coherence so that the respective PID is identified as normal whereas high divergence indicates that the PID cluster is anomalous. It should be understood that the probability density plots may include a line graph, a bar plot, or a scatter plot. After the anomalous PID cluster is identified, their values are compared against the specified values in diagnostic software routine. The design engineers either make changes in the diagnostic software routine or perform appropriate modifications in the component associated with the PID such that the anomalous values don't reoccur.

In step 38, a determination is made whether any of the projected values are high (i.e., substantially similar to the plotted probability distribution function of the training data set). If the determination is that the projected values are high, then the determination is made that the no anomalies exist in the PID data in step 39. The routine then proceeds to step 42 to determine if more PIDs require analysis.

If the determination made in step 38 that the projected values are low, then the determination is made that anomalies exist in the PID data in step 40. All information groups containing the respective PID are removed from the list in step 41. Moreover, the determination may be made that an error exists within the diagnostic algorithm given the presence of the anomaly.

In step 42, a determination is made whether more PIDs require testing. If more PIDs require testing, then a return is made to step 37 to initiate testing of additional PIDs. In no additional PIDs require testing, then for those PIDs where no anomaly exists, the routine proceeds to step 43.

In step 43, the fault classification technique is initiated. The information groups generated in step 34 are used to determine a divergence between the test data and the training data. During the testing phase, any set of PID values of the respective fault should have a similar joint probability distribution function of their independent components. Therefore, the KL divergence between the joint probability distributions of the modeled fault and test data is determined. If the determination is made that the KL divergence is low, then the fault is classified to the circuit being tested. If the determination is made that the KL divergence is high, then the fault is not attributed to the circuit being tested.

In step 43, an information group having no anomalous PIDs and the highest information content is selected. In step 44, the KL divergence is determined for the PIDs of the selected information group between the training data set and the test data set.

Figure 8:
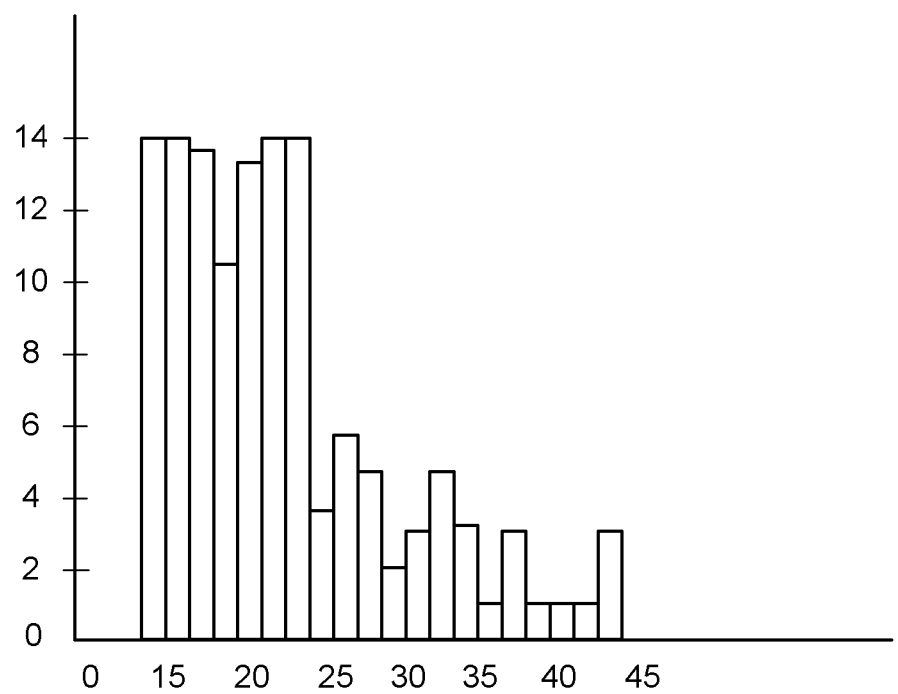
FIG. 8 is an exemplary bar graph illustrating a high KL divergence.
Figure 9:
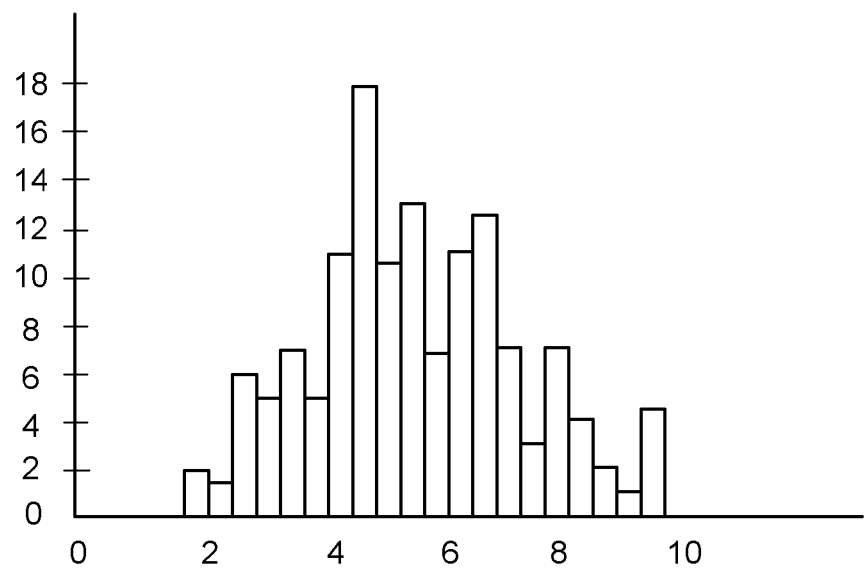
FIG. 9 is an exemplary bar graph illustrating a low KL divergence.

In step 45, a determination is made whether the KL divergence is high. FIG. 8 illustrates a plot illustrating a high KL divergence. A high KL divergence indicates that the fault is not in the tested circuit and the technician should look to other circuits to test. FIG. 9 illustrates a plot illustrating a low KL divergence. The KL divergence is represented by the x-axis and a frequency count is represented by the y-axis. A low KL divergence indicates that the fault is in the tested circuit and the technician should continue to test for faults in this circuit. If the determination is made in step 45 that the KL divergence is high, then the determination is made in step 46 that the fault does not belong to the circuit tested. If the determination is made in step 45 that the KL divergence is low, then the determination is made in step 47 that the fault belongs to the circuit tested. In step 48, the routine is terminated.

It should be understood that the embodiments described herein can be applied to industries where service diagnostics is performed on systems that include, but are not limited to, heavy equipments, aircraft, and space-craft. While certain embodiments of the present invention have been described in detail, those familiar with the art to which this invention relates will recognize various alternative designs and embodiments for practicing the invention as defined by the following claims.

What is claimed is:

1. A parameter identification-based fault isolation technique, the method comprising the steps of:
    executing a diagnostic software routine for identifying diagnostic trouble codes used to detect faults in a circuit of a current serviced vehicle, the diagnostic software routine further retrieving parameter identification data relating to the circuit identified with the detected fault;
    obtaining parameter identification data of prior serviced vehicles on a computer, the parameter identification data being retrieved from the prior serviced vehicles that include vehicles having same vehicle specifications as the current serviced vehicle under substantially similar operating conditions as the current serviced vehicle;
    grouping the parameter identification data of the prior serviced vehicles into a plurality of clusters based on mutual dependence to one another;
    determining a joint probability distribution as a function of a mutual dependence of the parameter identification data of the prior serviced vehicles;
    selecting parameter identification data of the current serviced vehicle having a coherence to the parameter identification data from the prior serviced vehicles;
    projecting a mutual dependence of the parameter identification data of the current serviced vehicle onto the corresponding joint probability distribution; and
    detecting an anomaly in the parameter identification data of the current serviced vehicle in response to the joint probability distribution of parameter identification data being outside of a predetermined variance, wherein the detected anomaly represents at least one of an error in the diagnostic software routine or an intermittent occurrence of a respective diagnostic trouble code; and
    modifying at least one of the diagnostic software routine or a component associated with the intermittent occurrence of the respective diagnostic trouble code to correct the error or intermittent re-occurrence of the respective diagnostic code.

2. The method of claim 1 further comprising the steps of:
    removing clusters containing the parameter identification data resulting in the probability distribution being outside of the predetermined variance in response to detecting an anomaly;
    selecting a next parameter identification data of the current serviced vehicle;
    projecting a mutual dependence of the next parameter identification data of the current serviced vehicle onto the corresponding joint probability distribution; and
    detecting an anomaly in the next parameter identification data of the current serviced vehicle in response to the probability distribution of the next parameter identification data being outside of a predetermined variance.

3. The method of claim 1 further comprising the step of determining whether a fault relates to the circuit in response to not detecting an anomaly in the parameter identification data of the current serviced vehicle.

4. The method of claim 3 wherein determining whether the fault relates to the circuit further comprises the steps of:
    determining a divergence between the selected parameter identification data of the current serviced vehicle and the selected parameter identification data of the prior serviced vehicles;
    determining if the divergence is less than a predetermined threshold; and
    determining that the fault is in the circuit in response to the divergence being less than the predetermined threshold.

5. The method of claim 4 wherein a determination is made that the fault isolation is not the result of the circuit in response to the divergence being greater than the predetermined threshold.

6. The method of claim 5 wherein the selected parameter identification data of the current serviced vehicle and the prior serviced vehicles used to identify a divergence is determined using one of a plurality of information groups, wherein a plurality of information groups are formed utilizing parameter identification data from each of the clusters, each information group consisting of parameter identification data randomly selected from each cluster.

7. The method of claim 6 wherein the information group selected from the plurality of information groups has no detected anomaly.

8. The method of claim 7 wherein the information group selected from the plurality of information groups has a greatest degree of joint entropy within the information group.

9. The method of claim 1 wherein obtaining parameter identification data of prior serviced vehicles further includes performing redundancy checking for reducing redundancy in the parameter identification data of the prior serviced vehicles.

10. The method of claim 9 wherein redundancy checking is applied using a principal component analysis technique.

11. The method of claim 10 wherein redundancy checking is further applied using an independent component analysis.

12. The method of claim 1 wherein the grouping of the plurality of clusters based on mutual dependence to one another utilizes a Euclidean distance based measuring technique.

13. The method of claim 1 wherein the grouping of the plurality of clusters based on mutual dependence to one another utilizes a mutual information based measuring technique.

14. The method of claim 1 wherein the detected anomaly represents an intermittent fault in a circuit of the current serviced vehicle, wherein the diagnostic trouble code generated by the diagnostic software routine is modified to identify the intermittent fault.

15. The method of claim 14 wherein an off-vehicle analysis tool labels a diagnostic trouble code as intermittent in response to a diagnostic trouble code being activated and deactivated without servicing the vehicle.

16. The method of claim 14 wherein projecting a mutual dependence of the parameter identification data of the current serviced vehicle onto the corresponding joint probability distribution includes projecting only parameter identification data of the current serviced vehicle associated with the identified intermittent diagnostic code on the corresponding joint probability distribution.

17. The method of claim 16 wherein detecting an anomaly in the parameter identification data of the current serviced vehicle is in response to the probability distribution of parameter identification data of the current serviced vehicle associated with the identified intermittent diagnostic code being outside of the predetermined variance.

18. The method of claim 1 wherein modifying a component associated with the intermittent occurrence includes modifying the component associated with the parameter identification data of the current serviced vehicle to prevent the anomalous parameter identification values from reoccurring.

* * * * *